(12) United States Patent
Rothman et al.

(10) Patent No.: US 8,745,364 B2
(45) Date of Patent: Jun. 3, 2014

(54) METHOD AND APPARATUS FOR ENABLING NON-VOLATILE CONTENT FILTERING

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1270 days.

(21) Appl. No.: 11/010,981

(22) Filed: Dec. 13, 2004

(65) Prior Publication Data

US 2006/0129744 A1 Jun. 15, 2006

(51) Int. Cl.
*G06F 21/00* (2013.01)

(52) U.S. Cl.
USPC .................................................. 713/2; 726/1

(58) Field of Classification Search
USPC .................................................. 726/1; 713/2
See application file for complete search history.

(56) References Cited

U.S. PATENT DOCUMENTS

| | | | |
|---|---|---|---|
| 5,440,740 A * | 8/1995 | Chen et al. | 718/104 |
| 5,696,968 A * | 12/1997 | Merkin | 713/2 |
| 5,844,986 A * | 12/1998 | Davis | 713/187 |
| 5,930,504 A * | 7/1999 | Gabel | 713/2 |
| 6,067,625 A * | 5/2000 | Ryu | 726/18 |
| 6,353,885 B1 * | 3/2002 | Herzi et al. | 713/1 |
| 6,510,521 B1 * | 1/2003 | Albrecht et al. | 713/193 |
| 2002/0099950 A1 * | 7/2002 | Smith | 713/200 |
| 2004/0111633 A1 * | 6/2004 | Chang | 713/200 |
| 2004/0153554 A1 * | 8/2004 | Kawakami | 709/229 |
| 2005/0081024 A1 * | 4/2005 | Khatri et al. | 713/100 |

OTHER PUBLICATIONS

"Extensible Firmware Interface Specification", Intel, Version 1.02, Dec. 12, 2000, p. 320.*
Extensible Firmware Interface Specification, Version 1.02, Dec. 12, 2000, pp. 82-83.*

* cited by examiner

*Primary Examiner* — Yogesh Paliwal
(74) *Attorney, Agent, or Firm* — Lawrence Cho Attorney at Law

(57) ABSTRACT

A method for managing a basic input output system (BIOS) includes filtering a request to change a policy of a platform associated with the BIOS. Other embodiments are described and claimed. According to one embodiment of the present invention, a request to change a parameter associated with the policy of the platform of the BIOS is compared with permissible requests under a platform non-volatile content policy stored in a non-volatile storage unit in the BIOS. The request is allowed if the request is permitted by the non-volatile content policy.

20 Claims, 5 Drawing Sheets

METHOD AND APPARATUS FOR ENABLING NON-VOLATILE CONTENT FILTERING

TECHNICAL FIELD

Embodiments of the present invention pertain to a method of managing a basic input output system (BIOS). More specifically, embodiments of the present invention relate to a method and apparatus for enabling non-volatile content filtering to protect parameters associated with variables stored in a non-volatile storage unit from being improperly altered.

BACKGROUND

The Extensible Firmware Interface (EFI) specification (version 1.10 published December 2002) describes an interface between the operating system (OS) and platform firmware, such as the basic input output system (BIOS). The interface is in the form of data tables that include platform-related information, and boot and runtime service calls that are available to the OS loader and the OS. Together, these provide a standard environment for booting an OS.

The EFI specification defines a way for the OS and platform firmware to communicate information necessary to support the OS boot process. This is accomplished through a formal and complete abstract specification of the software-visible interface presented to the OS by the platform and firmware. An EFI compliant OS is able to boot on a variety of EFI compliant system designs without further platform or OS customization.

The EFI specification describes a boot manager that can be configured by modifying a parameter associated with an architecturally defined variable such as a non-volatile random access memory (NVRAM) variable. The boot manager loads EFI drivers and EFI applications in an order defined by NVRAM variables. The platform firmware uses the boot order specified in the NVRAM variables for normal boot. The platform firmware may add extra boot options and remove invalid boot options from the boot order list, and grant access privileges to users as defined by the NVRAM variables.

The NVRAM variables utilized by the EFI specification, however, are stored in a non-volatile storage that is accessible through application program interfaces (APIs). This makes the NVRAM variables and the platform utilizing them vulnerable to improper alterations. For example, an NVRAM variable may be modified such that an OS kernel upon reboot might change its default user access to Root giving any user unlimited access to the platform.

Thus, what is needed is a method and apparatus for enabling non-volatile content filtering to protect parameters associated with variables stored in a non-volatile storage unit from being improperly altered.

DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. However, it will be apparent to one skilled in the art that these specific details may not be required to practice the embodiments of the present invention. In other instances, well-known circuits, devices, and programs are shown in block diagram form to avoid obscuring embodiments of the present invention unnecessarily.

Figure 1:
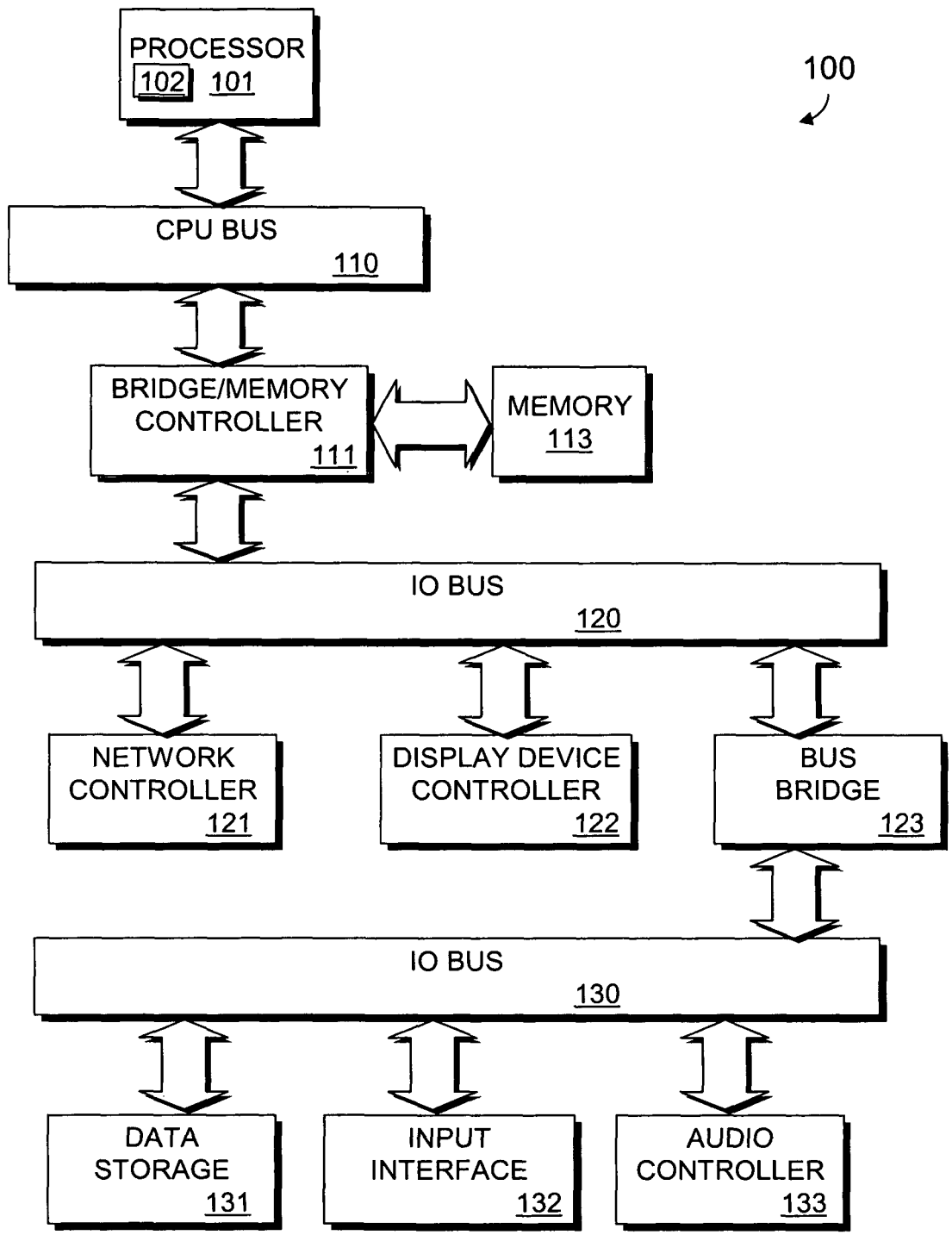
FIG. 1 illustrates a block diagram of a computer system in which an example embodiment of the present invention resides.

FIG. 1 is a block diagram of an exemplary computer system 100 in which an embodiment of the present invention resides. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. The processor 101 is coupled to a CPU bus 110 that transmits data signals between processor 101 and other components in the computer system 100.

The computer system 100 includes a memory 113. The memory 113 includes a main memory that may be a dynamic random access memory (DRAM) device. The main memory may store instructions and code represented by data signals that may be executed by the processor 101. According to one embodiment, the memory 113 includes a non-volatile memory. The non-volatile memory stores instructions and code represented by data signals that may be executed by the processor 101. The basic input output system (BIOS) of the computer system 100 may be stored on the non-volatile memory. The BIOS may be an EFI compliant BIOS having a policy scanning unit that allows the filtering of requests to change or access parameters associated with variables stored in the non-volatile memory.

A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first input output (IO) bus 120.

The first IO bus 120 may be a single bus or a combination of multiple buses. The first IO bus 120 provides communication links between components in the computer system 100. A network controller 121 is coupled to the first IO bus 120. The network controller 121 may link the computer system 100 to a network of computers (not shown) and supports communication among the machines. A display device controller 122 is coupled to the first IO bus 120. The display device controller 122 allows coupling of a display device (not shown) to the computer system 100 and acts as an interface between the display device and the computer system 100.

A second IO bus 130 may be a single bus or a combination of multiple buses. The second IO bus 130 provides communication links between components in the computer system 100. A data storage device 131 is coupled to the second IO bus 130. The data storage device 131 may be a hard disk drive, a floppy disk drive, a CD-ROM device, a flash memory device or other mass storage device. An input interface 132 is coupled to the second IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. An audio controller 133 is coupled to the second 10 bus 130. The audio controller 133 operates to coordinate the recording and playing of sounds. A bus bridge 123 couples the first IO bus 120 to the second IO bus 130. The bus bridge 123 operates to buffer and bridge data signals between the first IO bus 120 and the second 10 bus 130.

Figure 2:
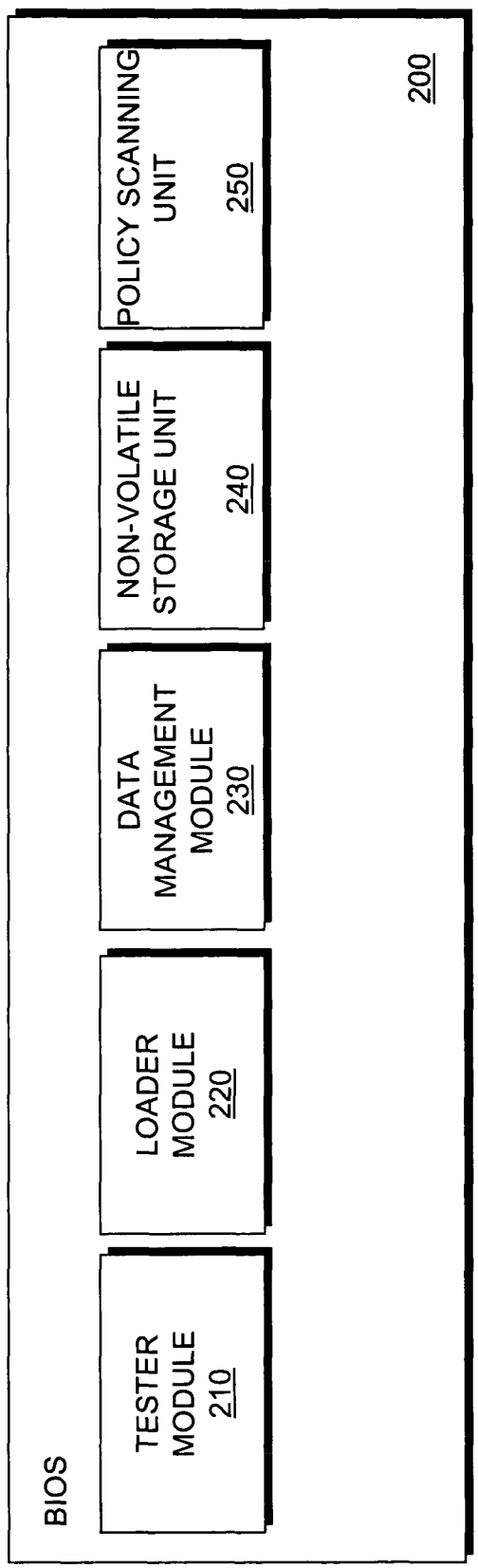
FIG. 2 is a block diagram of a basic input output system used by a computer system according to an example embodiment of the present invention.

FIG. 2 is a block diagram of a BIOS 200 used by a computer system according to an embodiment of the present invention. The BIOS 200 shown in FIG. 2 may be used to implement the BIOS stored in the memory 113 (shown in FIG. 1) and may be EFI compliant. The BIOS 200 includes programs that may be run when a computer system is booted up and programs that may be run in response to triggering events. The BIOS 200 may include a tester module 210. The tester module 210 performs a power-on self test (POST) to determine whether the components on the computer system are operational.

The BIOS 200 may include a loader module 220. The loader module 220 locates and loads programs and files to be executed by a processor on the computer system. The programs and files may include, for example, boot programs, system files (e.g. initial system file, system configuration file, etc.), and the operating system.

The BIOS 200 may include a data management module 230. The data management module 230 manages data flow between the operating system and components on the computer system 100. The data management module 230 may operate as an intermediary between the operating system and components on the computer system and operate to direct data to be transmitted directly between components on the computer system.

The BIOS 200 may include a non-volatile storage unit 240. The non-volatile storage 240 may be used to store variables such as NVM variables used by the BIOS 200 according to the EFI specification. According to an embodiment of the present invention, the NVM variables have an architecturally defined meaning. The NVM variables have values that are persistent across resets and power cycles. Exemplary NVM variables are listed as follows.

| Variable Name | Description |
| --- | --- |
| Lang | The language code that the system is configured for |
| ConIn | The device path of the default input console |
| ConOut | The device path of the default output console |
| ErrOut | The device path of the default error output device |
| Boot#### | A boot load option |
| BootOrder | The ordered boot option load list |
| BootNext | The boot option for the next boot only |
| Driver#### | A driver load option |
| DriverOrder | The ordered driver load option list |

The NVM variables may be defined as key/value pairs that include identifying information plus attributes (the key), and arbitrary data (the value). The NVM variables may be used as a means to store data that is passed between an EFI environment implemented in a platform and EFI OS loaders and other applications that run in the EFI environment.

The BIOS 200 may include a policy scanning unit 250. The policy scanning unit 250 filters requests to change or access parameters associated with NVM variables in the non-volatile memory unit 240. A request to change or access parameters associated with a NVM variable may be made using variable services supported by the EFI specification such as the SetVariable or GetVariable functions. According to an embodiment of the BIOS 200, the policy scanning unit 250 may evaluate a request to change or access the parameters with a platform non-volatile content policy. The platform non-volatile content policy may be configured in response to user preferences and stored in the non-volatile memory unit 240. The request may be passed to a non-volatile access function upon determining that the request is permissible. Alternatively, an error may be returned upon determining that the request is not permissible.

It should be appreciated that the tester module 210, loader module 220, data management module 230, non-volatile storage unit 240, and policy scanning unit 250 may be implemented using any appropriate procedure or technique.

Figure 3:
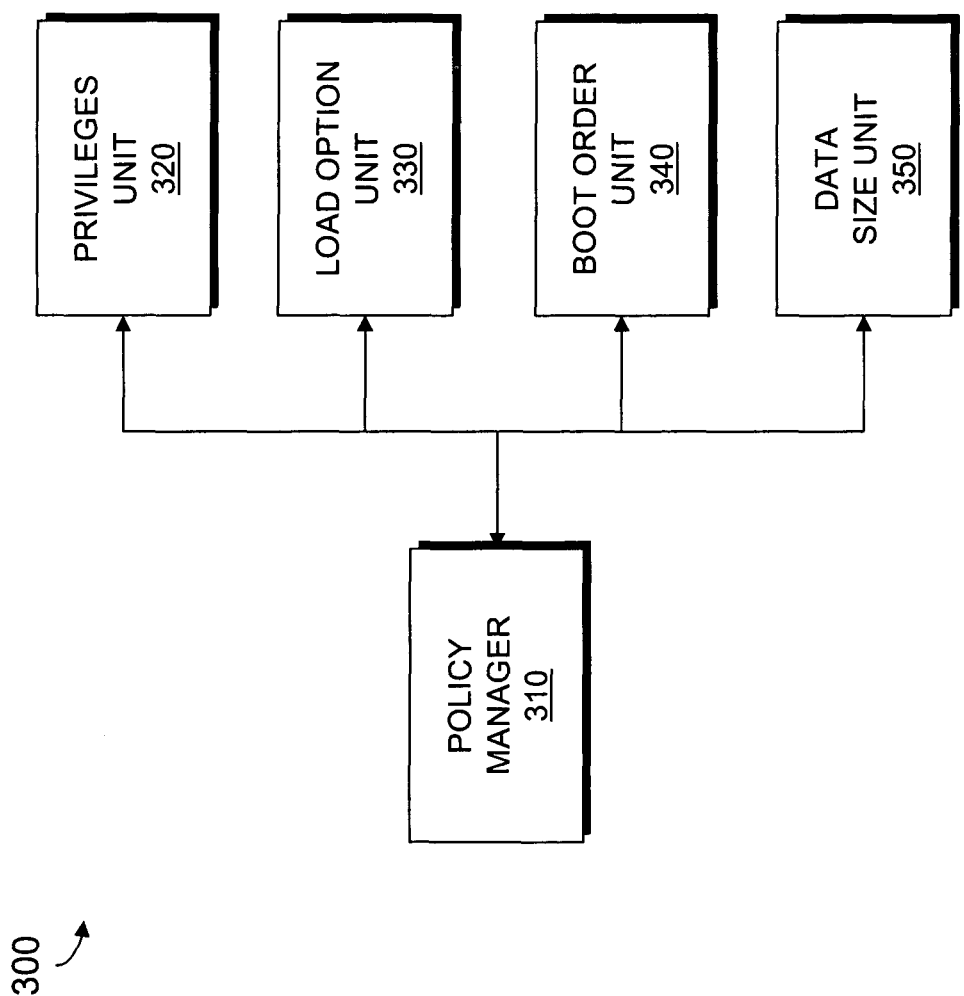
FIG. 3 is a block diagram of a policy scanning unit according to an example embodiment of the present invention.

FIG. 3 is a block diagram of a policy scanning unit 300 according to an example embodiment of the present invention. The policy scanning unit 300 may be implemented as the policy scanning unit 250 shown in FIG. 2. The policy scanning unit 300 includes a policy manager 310. Upon power-on or system reset of a platform, the policy manager 310 retrieves the non-volatile content policy of the platform. The policy manager 310 also receives requests to change or access parameters associated with a NVRAM variable. The policy manager 310 interfaces with and transmits information to and between other components in the policy scanning unit 300.

The policy scanning unit 300 includes a privileges unit 320. The privileges unit 320 determines whether a request to change a parameter associated with a NVRAM variable that sets policy regarding user privileges is permissible. According to an embodiment of the policy scanning unit 300, the privileges unit 320 determines whether a request to modify data parameter corresponding to a boot variable, such as Boot####, to include the term "single" is permissible under the platform non-volatile content policy. Modification of the data parameter of the Boot#### variable to include the term "single" would grant a user Root access to the platform.

The policy scanning unit 300 includes a load option unit 330. The load option unit 330 determines whether a request to change or access a parameter associated with a NVRAM variable that sets policy regarding programs that are loaded is permissible. According to an embodiment of the policy scanning unit 300, the load option unit 330 determines whether a request to modify or access parameters corresponding to the variables Boot#### or Driver #### is permissible under the platform non-volatile content policy. Modification to boot options and driver options may allow the loading of rogue agents onto the platform.

The policy scanning unit 300 includes a boot order unit 340. The boot order unit 340 determines whether a request to change or access a parameter associated with a NVRAM variable that sets policy regarding an order in which programs and sources are booted on the platform is permissible. According to an embodiment of the policy scanning unit 300, the boot order unit 340 determines whether a request to modify or access parameters corresponding to the BootOrder variable is permissible under the platform non-volatile content policy. Modification of the parameters associated with the BootOrder variable may allow the booting of the platform from a less secure source before attempting to boot the platform from a more secure source and compromise the platform.

The policy scanning unit 300 includes a data size unit 350. The data size unit 350 determines whether a request to change a parameter associated with a NVRAM variable that sets policy regarding a size for a NVRAM variable stored in a non-volatile storage is permissible. According to an embodiment of the policy scanning unit 300, the data size unit 350 determines whether a request to modify parameters corresponding to the data parameter in a NVRAM variable is permissible under the non-volatile content policy. Modification of the data size parameter of a NVRAM variable to zero deletes the NVRAM variable.

In response to determining that a request to modify or access a parameter associated with a NVRAM variable is permissible, the policy manager 310 passes the request to a non-volatile access function. Alternatively, if it is determined that a request to modify or access a parameter associated with a NVRAM variable is impermissible, the policy manager 310 generates an error.

The policy manager 310, privileges unit 320, load option unit 330, boot order unit 340, and data size unit 350 may be implemented using any appropriate procedure or technique. It should be appreciated that other components may be implemented by the policy scanning unit 300 to filter requests to modify or access parameters associated with other NVRAM variables supported by a BIOS.

Figure 4:
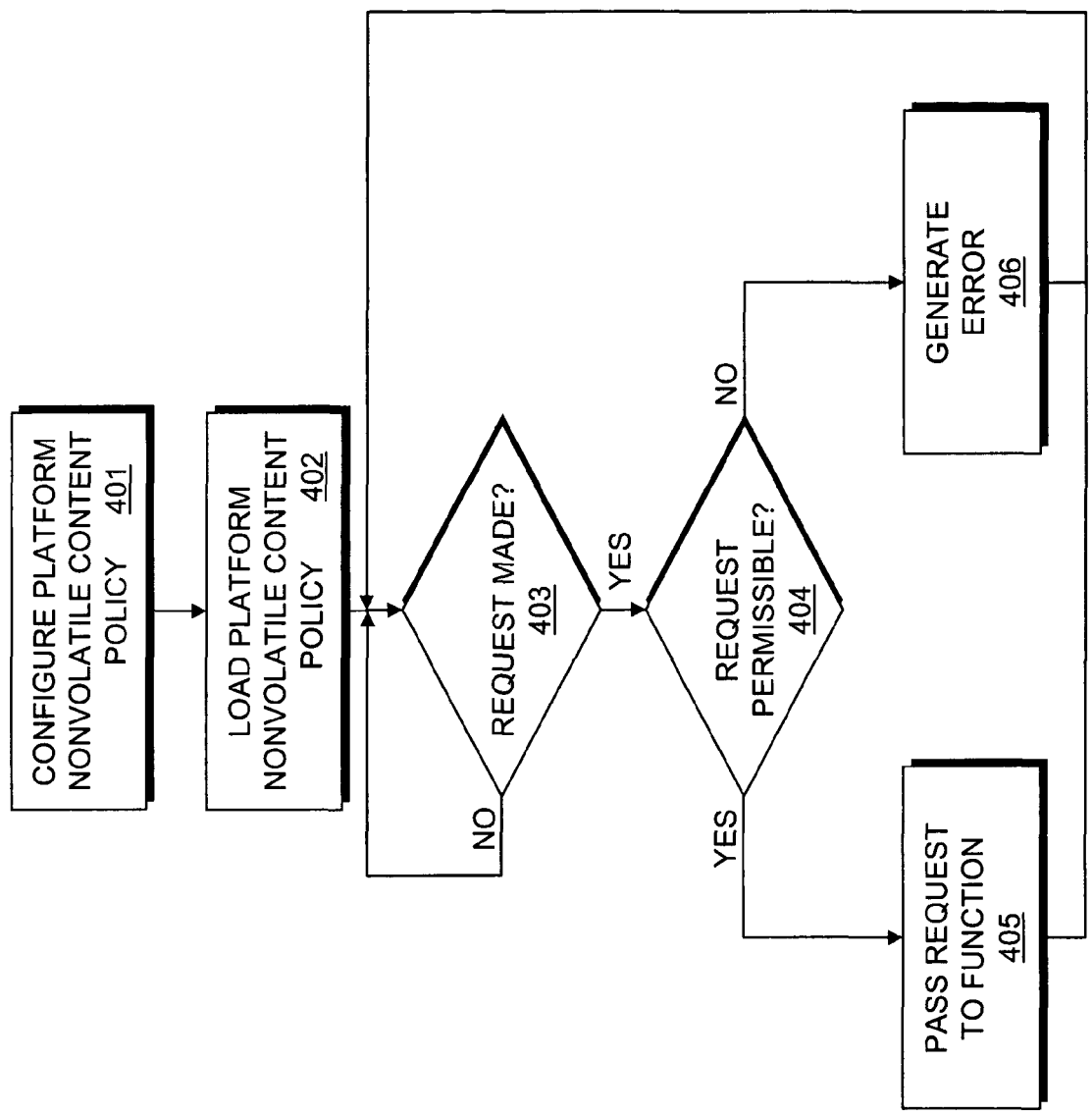
FIG. 4 is a flow chart of a method for managing a basic input output system according to an example embodiment of the present invention.

FIG. 4 is a flow chart of a method for managing a BIOS according to an example embodiment of the present invention. The method described in FIG. 4 may be implemented by the policy scanning unit 300 shown in FIG. 3. At 401, platform non-volatile content policy is configured. According to an embodiment of the present invention, the platform non-volatile content policy may be configured in response to user preferences. The user preferences may be inputted into a computer system, for example, during a BIOS setup. The platform non-volatile content policy may be stored in a non-volatile storage.

At 402, the platform non-volatile content policy is loaded onto a policy scanning unit. According to an embodiment of the present invention, a user may be given an option to have requests to change or access parameters associated with NVRAM variables filtered according to the platform non-volatile content policy. In this embodiment, the platform non-volatile content policy is loaded onto the policy scanning unit when this option is selected.

At 403, it is determined whether a request to change or access a parameter associated with a NVRAM variable has been made. According to an embodiment of the present invention, this may be achieved by determining whether a write or read request has been made to the non-volatile storage. If a request has not been made, control returns to 403. If a request has been made, control proceeds to 404.

At 404, it is determined whether the request to change or access the parameter associated with the NVRAM variable is permissible. According to an embodiment of the present invention, the request is compared with the non-volatile content policy. If it is determined that the request is permissible, control proceeds to 405. If it is determined that the request is not permissible, control proceeds to 406.

At 405, the request is passed to a non-volatile access function. According to an embodiment of the present invention, the non-volatile access function may be a motherboard internal non-volatile access function. Control returns to 403.

At 406, an error indication is generated. According to an embodiment of the present invention, an error indication may be returned to a calling OS API. Control returns to 403.

Figure 5:
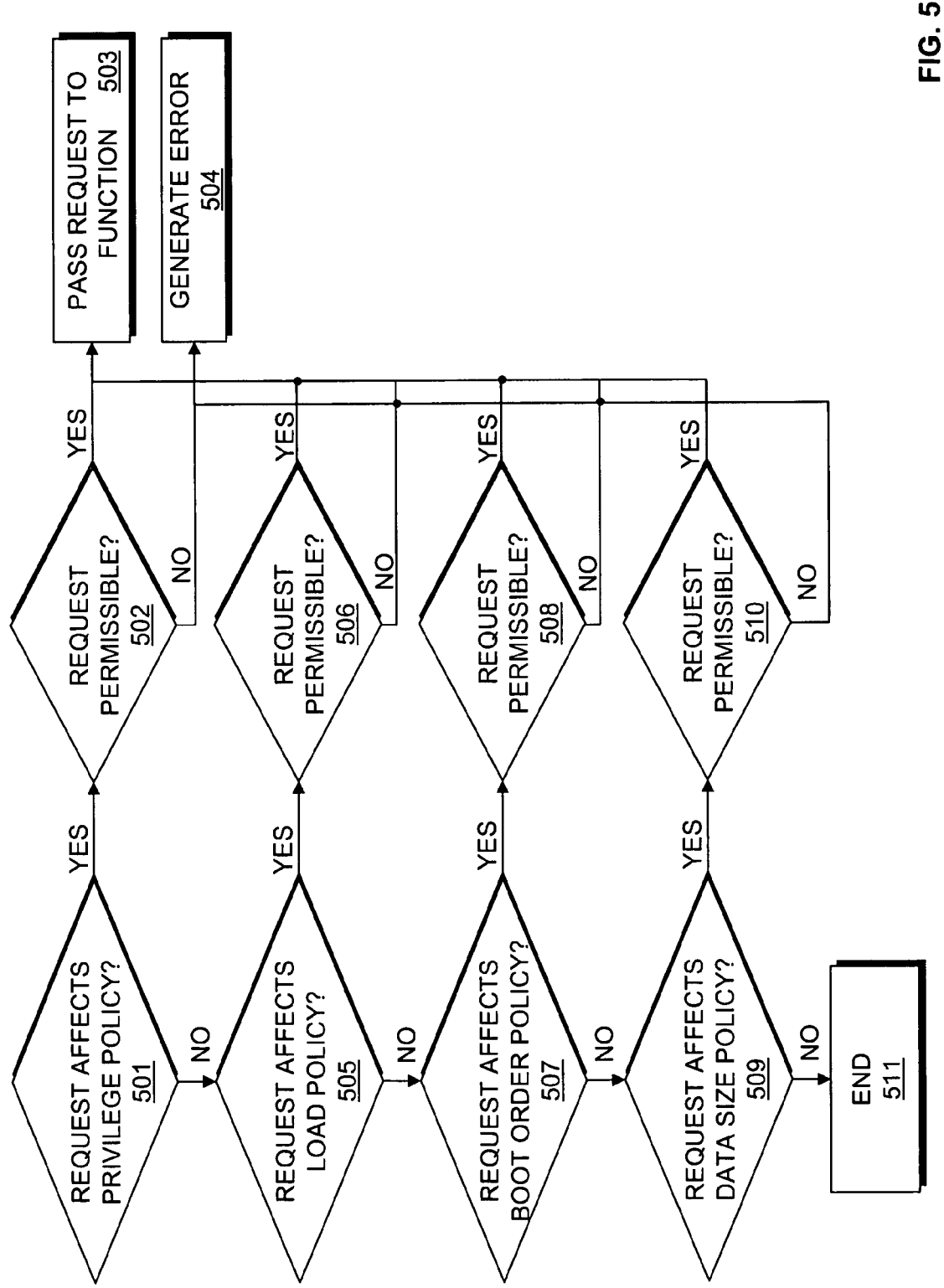
FIG. 5 is a flow chart illustrating a method for performing non-volatile content filtering example embodiment of the present invention.

FIG. 5 is a flow chart illustrating a method for performing non-volatile content filtering according to an embodiment of the present invention. The method shown in FIG. 5 may be used to implement 404-406 shown in FIG. 4. At 501, a determination is made as to whether a request to change a parameter associated with a NVRAM variable affects policy regarding user privileges. According to an embodiment of the present invention, this may be achieved by determining whether the request modifies the data parameter in the Boot#### variable. If the request relates to affecting privilege policy, control proceeds to 502. If the request does not relate affecting privilege policy, control proceeds to 505.

At 502, it is determined whether the request to change the parameter associated with the NVRAM variable is permissible. According to an embodiment of the present invention, this may be achieved by determining whether a request to modify the data parameter in the Boot#### variable to include the term "single" is permissible under the platform non-volatile content policy. If the request is permissible, control proceeds to 503. If the request is not permissible, control proceeds to 504.

At 503, the request is passed to a non-volatile access function. According to an embodiment of the present invention, the non-volatile access function may be a motherboard internal non-volatile access function.

At 504, an error indication is generated. According to an embodiment of the present invention, an error indication may be returned to a calling OS API.

At 505, a determination is made as to whether a request to change the parameter associated with the NVRAM variable relates to affecting policy regarding load options. If the request relates to affecting load option policy, control proceeds to 506. If the request does not relate to affecting load policy, control proceeds to 507.

At 506, it is determined whether the request to change the parameter associated with the NVRAM variable is permissible. According to an embodiment of the present invention, this may be achieved by determining whether modifying parameters corresponding to the Boot#### or Driver #### variables is permissible under the platform non-volatile content policy. If the request is permissible, control proceeds to 503. If the request is not permissible, control proceeds to 504.

At 507, a determination is made as to whether a request to change the parameter associated with the NVRAM variable relates to affecting policy regarding a boot order. If the request relates to affecting boot order policy, control proceeds to 508. If the request does not relate to affecting boot order policy, control proceeds to 509.

At 508, it is determined whether the request to change the parameter associated with the NVRAM variable is permissible. According to an embodiment of the present invention, this may be achieved by determining whether modifying parameters corresponding to the variable BootOrder is permissible under the platform non-volatile content policy. If the request is permissible, control proceeds to 503. If the request is not permissible, control proceeds to 504.

At 509, a determination is made as to whether a request to change the parameter associated with the NVRAM variable relates to affecting policy regarding the size of a variable stored in non-volatile storage. If the request relates to affecting variable size, control proceeds to 510. If the request does not relate to affecting variable size, control proceeds to 511.

At 510, it is determined whether the request to change the parameter associated with the NVRAM variable is permissible. According to an embodiment of the present invention, this may be achieved by determining whether modifying the data parameter in a NVRAM variable is permissible under the platform non-volatile content policy. If the request is permissible, control proceeds to 503. If the request is not permissible, control proceeds to 504.

At 511, control terminates the procedure.

FIGS. 4 and 5 are flow charts illustrating example embodiments of the present invention. Some of the procedures illustrated in the figures may be performed sequentially, in parallel or in an order other than that which is described. It should be appreciated that not all of the procedures described are required, that additional procedures may be added, and that some of the illustrated procedures may be substituted with other procedures.

In the foregoing specification, the embodiments of the present invention have been described with reference to specific exemplary embodiments thereof. It will, however, be evident that various modifications and changes may be made thereto without departing from the broader spirit and scope of the embodiments of the present invention. The specification and drawings are, accordingly, to be regarded in an illustrative rather than restrictive sense.

What is claimed is:

1. A method for managing a basic input output system (BIOS), comprising:
    configuring a platform non-volatile content policy applicable to all users of a computer system in response to user preferences inputted during BIOS setup, wherein the platform non-volatile content policy specifies permissible changes that may be made to a policy of a platform of the BIOS;
    comparing a request to change a parameter associated with the policy of the platform of the BIOS with the permissible changes in the platform non-volatile content policy;
    allowing the request when the request is permitted by the non-volatile content policy while leaving other parameters associated with the policy of the platform of the BIOS unchanged; and
    returning an error to an operating system application program interface upon determining that the request is not permissible.

2. The method of claim 1, further comprising having a policy manager in the BIOS the request to a non-volatile access function to perform the change upon determining that the request is permissible.

3. The method of claim 1, wherein the parameter relates to user privileges.

4. The method of claim 1, wherein the parameter relates to boot order.

5. The method of claim 1, wherein the parameter relates to boot options.

6. The method of claim 1, wherein the parameter relates to driver options.

7. The method of claim 1, wherein the parameter relates to a data size of a variable stored in the non-volatile storage unit in the BIOS.

8. The method of claim 1, wherein the platform non-volatile content policy stored in the non-volatile storage unit in the BIOS identifies permissible modifications that may be made to parameters associated with the policy of the platform of the BIOS.

9. A basic input output system (BIOS), comprising:
    a non-volatile storage to store variables to indicate how policy on a platform is to be implemented and a platform non-volatile content policy; and
    a policy scanning unit to configure the platform non-volatile content policy applicable to all users of a computer system in response to user preferences inputted during BIOS setup and operable to compare a request to change a parameter associated with a variable with permissible requests under the platform non-volatile content policy stored on the non-volatile storage and to allow the request when the request is permitted by the non-volatile content policy, and returning an error to an operating system application program interface upon determining that the request is not permissible.

10. The apparatus of claim 9, wherein the policy scanning unit comprises a privileges unit to determine whether modifying a data parameter in a Boot#### variable is permissible under the platform non-volatile content policy.

11. The apparatus of claim 9, wherein the policy scanning unit comprises a load option unit to determine whether modifying a parameter in the Boot#### or Driver#### variable is permissible under the platform non-volatile content policy.

12. The apparatus of claim 9, where the policy scanning unit comprises a boot order unit to determine whether modifying a parameter in the BootOrder variable is permissible under the platform non-volatile content policy.

13. The apparatus of claim 9, wherein the policy scanning unit comprises a data size unit to determine whether modifying a data size parameter in a variable is permissible under the platform non-volatile content policy.

14. A computer system, comprising:
    a processor;
    a bus coupled to the processor;
    a memory controller coupled to the bus;
    a non-volatile memory, directly coupled to the memory controller, to store a basic input output system (BIOS) having a non-volatile storage to store variables to indicate how policy on a platform is to be implemented, and a policy scanning unit to compare a first request to change a first parameter associated with a first variable with permissible requests under the platform non-volatile content policy stored on the non-volatile memory and to allow the first request when the request is permitted by the non-volatile content policy and to return an error to an operating system application program interface upon determining that the first request is not permissible.

15. The apparatus of claim 14, wherein the policy scanning unit comprises a privileges unit to determine whether modifying a data parameter in a Boot#### variable is permissible under the platform non-volatile content policy.

16. The apparatus of claim 14, wherein the policy scanning unit comprises a load option unit to determine whether modifying a parameter in the Boot#### or Driver#### variable is permissible under the platform non-volatile content policy.

17. The apparatus of claim 14, where the policy scanning unit comprises a boot order unit to determine whether modifying a parameter in the BootOrder variable is permissible under the platform non-volatile content policy.

18. The apparatus of claim 14, wherein the policy scanning unit comprises a data size unit to determine whether modifying a data size parameter in a variable is permissible under the platform non-volatile content policy.

19. The apparatus of claim 14, wherein the platform non-volatile content policy is configured in response to preferences input by a user.

20. The apparatus of claim 14, wherein the platform non-volatile content policy is configured in response to preferences input by a user during BIOS setup.

* * * * *

UNITED STATES PATENT AND TRADEMARK OFFICE
CERTIFICATE OF CORRECTION

PATENT NO. : 8,745,364 B2
APPLICATION NO. : 11/010981
DATED : June 3, 2014
INVENTOR(S) : Michael A. Rothman et al.

It is certified that error appears in the above-identified patent and that said Letters Patent is hereby corrected as shown below:

In the Claims:

In column 7, line 49, in claim 2, after "BIOS" insert -- pass --.

Signed and Sealed this
Ninth Day of September, 2014

Michelle K. Lee
*Deputy Director of the United States Patent and Trademark Office*